(12) United States Patent
Markoulidakis (10) Patent No.: US 8,116,789 B2
(45) Date of Patent: Feb. 14, 2012

(54) TERMINAL POSITIONING TECHNIQUE

(75) Inventor: Yannis George Markoulidakis, Nea Smyrni (GR)

(73) Assignee: Vodafone Group PLC, Newbury, Berkshire (GB)

( * ) Notice: Subject to any disclaimer, the term of this patent is extended or adjusted under 35 U.S.C. 154(b) by 0 days.

(21) Appl. No.: 12/645,147

(22) Filed: Dec. 22, 2009

(65) Prior Publication Data

US 2010/0216488 A1    Aug. 26, 2010

(30) Foreign Application Priority Data

Dec. 22, 2008    (GB) .................................... 0823236.5

(51) Int. Cl.
*H04W 24/00*    (2009.01)
*H04M 11/04*    (2006.01)

(52) U.S. Cl. ................. 455/456.5; 455/404.2; 455/456.1

(58) Field of Classification Search ............... 455/404.2, 455/456.1, 456.5, 414.2
See application file for complete search history.

(56) References Cited

U.S. PATENT DOCUMENTS

| | | | |
|---|---|---|---|
| 6,246,861 B1 | 6/2001 | Messier et al. | |
| 7,398,092 B2 * | 7/2008 | An ............................. | 455/456.1 |
| 7,856,235 B2 * | 12/2010 | Syrjarinne ................. | 455/456.1 |
| 2008/0026733 A1 * | 1/2008 | Jaatinen ..................... | 455/414.2 |
| 2008/0153507 A1 | 6/2008 | Taaghol et al. | |

FOREIGN PATENT DOCUMENTS

| | | |
|---|---|---|
| EP | 1 315 393 | 5/2003 |
| GB | 2416461 | 1/2006 |
| WO | 03/071303 | 8/2003 |
| WO | 2004/023155 | 3/2004 |
| WO | 2006/096923 | 9/2006 |

OTHER PUBLICATIONS

Extended European Search Report issued on Nov. 9, 2010 in connection with corresponding European Patent Application No. 09275129.6.

Orooji M et al: "New Method for Estimation of Mobile Location Based on Signal Attenuation and Hata Model Signal Prediction" Engineering in Medicine and Biology Society, 2005. IEEE-EMBS 2005. 27th Annual International Confernece of the Shanghai, China Sep. 1-4, 2005, Piscataway, NJ, USA, IEEE LNKD-DOI: 10.1109/IEMBS.2005.1615865, pp. 6025-6028, XP010907208.

(Continued)

*Primary Examiner* — Un C Cho
(74) *Attorney, Agent, or Firm* — Workman Nydegger (57) ABSTRACT

A technique of estimating the location of a mobile terminal in a mobile communications network having a plurality of base stations, including: determining at least one signal parameter measurement for the mobile terminal in relation to each of the plurality of base stations; using the determined signal parameter measurements to obtain a first distance estimation of the location of the mobile terminal from each of the plurality of base stations; and using at least one estimator to obtain a positional estimation of the mobile terminal. The estimators are statistical estimators that can be applied to a distance estimation of the mobile terminal from each of the base stations and/or applied to a triangulation estimation of the actual position of the mobile terminal, based upon estimated distances of the mobile terminal from the plurality of base stations. Preferably the signal parameter measured is the Received Signal Strength.

10 Claims, 5 Drawing Sheets

OTHER PUBLICATIONS

Markoulidakis J G et al: "Stamp Accuracy Enhancement Through Received Signal Strength Adaptive Kalman Filtering" IEEE International Symposium on Personal, Indoor and Mobile Radio Communications. PIMRC, IEEE; PI, XX, Sep. 1, 2007, pp. 1-5, XP031168109.

Hata M: "Empirical Formula for Propagation Loss in Land Mobile Radio Services" IEEE Transactions on Vehicular Technology, IEEE Service Center, Piscataway, NJ, US, vol. VT-29, No. 3, Aug. 1, 1980, pp. 317-325, XP000647130.

* cited by examiner

TERMINAL POSITIONING TECHNIQUE

This application claims the benefit of United Kingdom Patent Application No. GB0823236.5, filed Dec. 22, 2008, entitled "Terminal Positioning Technique," which is incorporated herein by reference in its entirety.

This invention relates to a mobile terminal positioning and/or tracking technique and associated equipment. More particularly the present invention relates to the positioning and/or tracking of a mobile communication terminal the terminal itself in a mobile communication network and associated communication network equipment.

With the increasing capacity and area coverage of cellular networks around the world, mobile telecommunications providers are able to provide new and improved services for their customers. In particular, one type of service in which there has been an increased interest in of late is Location Based Services (LBS).

LBS provide a mobile terminal user with location based content delivery, such as local weather forecasts, and can also enable the mobile terminal user to identify people or outlets near their vicinity. For instance, a mobile phone user can contact a LBS provider to identify their closest petrol station, restaurant, bank or the like, based upon the user's current mobile phone location. Similarly, it can be used to find the location of friends or family, such as for reasons of safety or emergency, or simply meeting up, by requesting the LBS provider for a location update on one or more person. These services can assist users, by saving them time, rather than travelling around a given geographical area, looking for a particular outlet/person, thus potentially avoiding traffic jams. It can also assist people in emergency situations, such as by helping them quickly identify their nearest hospital or the location of someone requiring emergency assistance.

These services require a positioning technique that can achieve reasonable positional accuracy while entailing commercially reasonable deployment costs. Such costs are generally related to the extent and complexity of additional software and hardware to be incorporated at the mobile terminals and/or in the network. There are also other issues to consider, such as any penalties imposed by the tracing techniques and procedures upon storage/memory requirements and battery power consumption at the mobile terminals.

A wide variety of mobile terminal positioning techniques have been proposed to date. The best performing positioning technique in terms of accuracy and reliability is currently the Assisted Global Positioning System (A-GPS). GPS is a technique where the terminal receives signals from a GPS satellite constellation. From the received signals, the terminal calculates its position based on the time-difference observed in the signals received from the different satellites. In A-GPS the mobile network (e.g. GSM) provides additional information through its air-interface to assist the terminal in estimating its position (e.g. differential GPS corrections). This leads to shorter "Time to First Fix" and lower terminal battery consumption.

However, A-GPS is quite a costly approach, and the relatively slow commercial uptake of Location Based Services combined with the high costs associated with GPS point towards it being a relatively long period of time before legacy 2G and 2G/3G mobile terminals will be equipped with GPS receivers on an extensive basis. Further, even after the introduction of GPS receivers in a large proportion of mobile terminals, since GPS requires direct contact with the satellites to function, the limited availability of satellite signal in indoor and certain outdoor environments (e.g. due to the urban canyon effect) indicate the need for hybrid techniques which combine A-GPS with a cellular based positioning.

One simple cellular based method uses the nearest cell area as a means to provide an approximate terminal position, for instance by determining the cell which provides the terminal with the strongest Received Signal Strength (RSS) measurements, the terminal is then assumed to be within the coverage area of that cell. The accuracy of this method of course depends upon the coverage area of the cell, and so will typically provide a mobile terminal position that is accurate to a range from 600 m to a couple of kilometers (i.e. 600 m-2000 m depending on the cell size). This method is one of the techniques currently being used by operators that have already introduced commercial LBS.

Terminal positioning techniques relying on Received Signal Strength (RSS) measurements are of reduced complexity to implement due to the fact that RSS measurements are available at the terminal side as part of its standard operation in both idle and dedicated mode. The main problem with RSS based positioning techniques is the accuracy they yield because of the signal variability resulting from the stochastic nature of the mobile radio propagation environment.

In GB2416461 a technique was disclosed which was termed "statistical terminal assisted mobile positioning" or briefly "STAMP". This technique allows for the exploitation of multiple RSS historical measurements collected while the terminal is in idle mode. During a set-up phase of a LBS, these RSS measurements are used with a positioning technique to estimate the terminal's position, and this estimate is then statistically processed so as to improve the accuracy of the determined terminal position, such as by using Kalman filtering. In this way, the "STAMP" technique was able to improve the accuracy of most existing tracing techniques, rendering them more useful for LBS applications. The STAMP technique, however, when applied over RSS measurements, is also susceptible to signal variability, particularly in regard to the multi-path effect affecting its accuracy. In GB2416461, this problem was addressed by eliminating measurements with high error content (e.g. due to fast fading).

Signal variability is particularly an issue when using STAMP with empirical models like Hata or Cost231, as these models estimate the distance between the terminal and the base station with distance being an exponential function of the RSS. Therefore, undue variability in the RSS measurements will result in drastically exaggerated estimation errors.

Whilst the STAMP technique has been found to provide a reasonable degree of positional accuracy, and to be implementable for a reasonable cost, the positional accuracy that is currently achieved could still be improved further, particularly in regard to mitigating the terminal positioning error introduced by RSS based techniques.

There is therefore a need for an enhanced network based positioning technique which combines adequate accuracy with low deployment costs.

The present invention seeks to overcome or alleviate at least one of these problems.

SUMMARY OF THE INVENTION

According to a first aspect, the present invention provides a method of estimating the location of a mobile terminal in a mobile communications network having a plurality of base stations, the method including:

determining at least one signal parameter measurement for the mobile terminal in relation to each of the plurality of base stations;

using the determined signal parameter measurements to obtain a first distance estimation of the location of the mobile terminal from each of the plurality of base stations; and using at least one estimator to obtain a positional estimation of the mobile terminal.

Preferably the step of using at least one estimator includes using an estimator to obtain a refined distance estimation of the mobile terminal from each of the plurality of base stations.

It is also preferable that the at least one signal parameter measurement determined is a Received Signal Strength (RSS) measurement and a RSS based positioning technique, such as Enhanced Cell Global Identity (ECGI) or STAMP, is used to obtain the first distance estimation of the mobile terminal location.

Advantageously the estimators minimise the impact of the position calculation process on the resulting accuracy of the positioning technique.

The estimators are preferably statistical estimators that can be applied to a distance estimation of the mobile terminal from each of the base stations and/or applied to a triangulation estimation of the actual position of the mobile terminal, based upon estimated distances of the mobile terminal from the plurality of base stations. The estimators are preferably derived by taking into account the nature of path-loss propagation models (like Hata and Cost231), the error introduced in the estimation of the Mobile Terminal-Base Station distance as well as the error introduced in the triangulation process.

Other aspects of the invention relate to a mobile telecommunications terminal and a communications network element, such as a Base Station, configured to implement the inventive aspect, particularly as set out in the attached claims.

BRIEF DESCRIPTION OF THE DRAWINGS

Embodiments of the invention will now be described with reference to the accompanying drawings, in which.

DETAILED DESCRIPTION OF EMBODIMENTS
OF THE INVENTION

Figure 1:
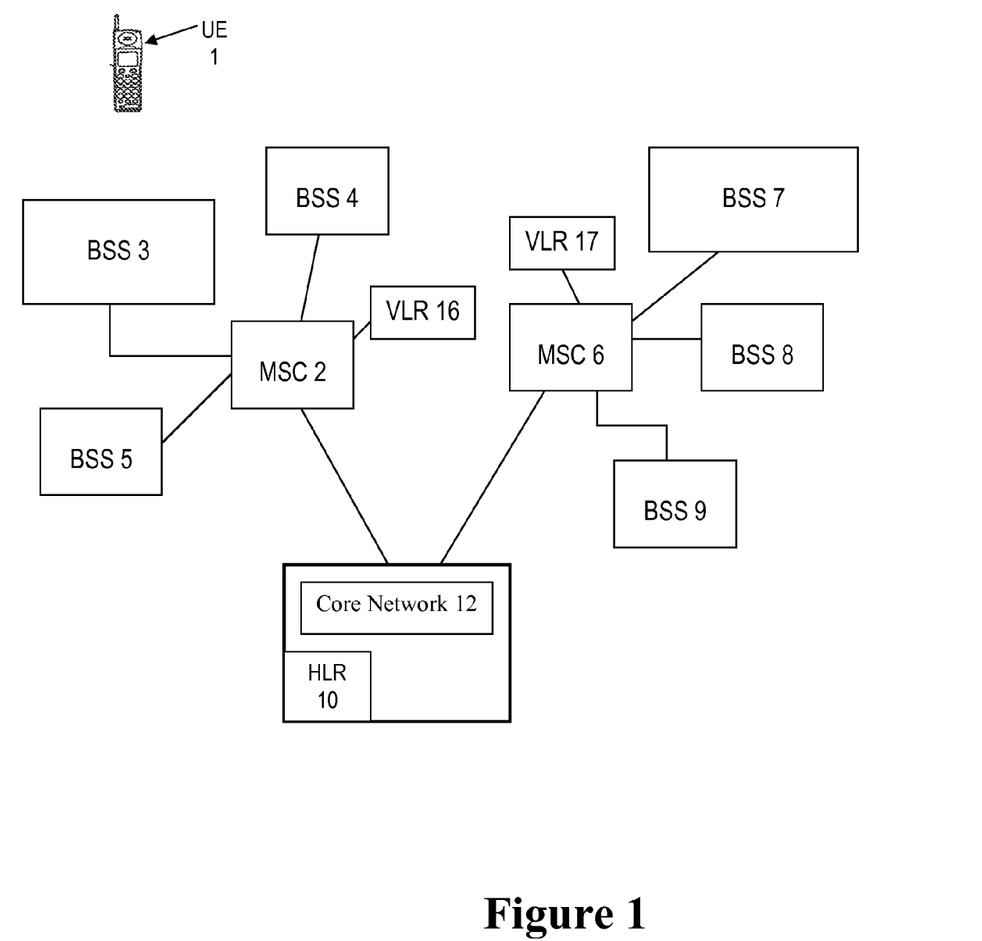
FIG. 1 illustrates a schematic diagram of a mobile telecommunications network in which the present invention may be implemented.

Key elements of a mobile telecommunications network, and its operation, will now briefly be described with reference to FIG. 1.

Each cell corresponds to a respective base station (BS) of its cellular or mobile telecommunications network that receives calls from and terminates calls at any mobile terminal in that cell by wireless radio communication in one or both of the circuit switched or packet switched domains. Such a subscriber's mobile terminal or User Equipment (UE) is shown at 1. The mobile terminal may be a handheld mobile telephone, a personal digital assistant (PDA) or a laptop computer equipped with a network datacard.

In a GSM mobile telecommunications network, the base station subsystem (BSS) comprises of the base transceiver stations (BTS) and the base station controller (BSC). A BSC may control more than one BTS. The BTSs and BSCs comprise the radio access network.

The present invention will be described in relation to a GSM network, although it is to be appreciated that the inventive concepts can readily be applied to other mobile network arrangements, including UMTS and SAE/LTE.

Conventionally, in a GSM network, the base stations are arranged in groups and each group of base stations is controlled by one mobile switching centre (MSC), such as MSC 2 for base stations 3, 4 and 5. As shown in FIG. 1, the network has another MSC 6, which is controlling a further three base stations 7, 8 and 9. In practice, the network will incorporate many more MSCs and base stations than shown in FIG. 1. The base stations 3, 4, 5, 7, 8 and 9 each have dedicated (not shared) connection to their MSC2 or MSC6—typically a cable connection. This prevents transmission speeds being reduced due to congestion caused by other traffic.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) which is not visible on the card and is not generally known to the subscriber. The subscriber is issued with a publicly known number, that is, the subscriber's telephone number, by means of which calls to the subscriber are initiated by callers. This number is the MSISDN.

The core network 12 includes a home location register (HLR) 10 which, for each subscriber to the network, stores the IMSI and the corresponding MSISDN together with other subscriber data, such as the current or last known Location Area of the subscriber's mobile terminal.

When a mobile terminal is in idle mode it selects one cell to be synchronised (the primary cell) based on the strongest received signal strength. To achieve this, the terminal periodically monitors the received signal strength from the primary and a set of up to six neighbouring cells. As the terminal moves, the set of monitored cells as well as the primary cell may change.

Whenever a mobile terminal (being in idle mode) selects a new primary cell which detects that it belongs to a different Location Area (through the Location Area Identity that each cell is broadcasting) from that of the previously selected primarily cell, the mobile terminal will then send a location area update request to the core network 12.

With this background in mind, implementations of the embodiments of the invention will now be described, in relation to the situation of a subscriber using mobile terminal 1 to initiate a Location Based Service (LBS).

When a user wishes to use the mobile terminal to initiate an LBS, the terminal will transfer from idle mode to active or dedicated mode, and commence the set-up phase for the LBS session. For instance, there are three different cases where the RSS can be exploited for supporting an LBS service:

(a) Regular Case: In this case the terminal at the setup phase of an LBS phase (i.e., being in dedicated mode) measures the RSS of the primary and the neighbouring cells and uploads this information to the network. As the terminal is in dedicated mode it can also provide the Timing Advance (TA) parameter which is made available as soon as a communication channel is being setup to support the session. The network in this case can employ the "Enhanced Cell Global Identity" (ECGI) positioning technique to locate the terminal (i.e. exploit the serving cell information, the TA and the RSS measurements for performing terminal positioning). Alternatively other hybrid positioning techniques can be applied by exploiting any other type of measurement from the cellular network or other technology (e.g. GPS) combined with the measured RSS and TA.

(b) STAMP (Statistical Terminal Assisted Mobile Positioning) concept: while the terminal 1 is in idle mode it will be periodically measuring the RSS from its primary and neighbouring cells. It does this by measuring and storing, typically in a time-stamped list for a predefined size, the RSS measurements from its primary cell as well as neighbouring cells. At the setup phase of the LBS the terminal uploads the list of the most recent RSS measurements together with a single TA measurement which was made available after the terminal entered the dedicated mode. The network exploits the time series of RSS measurements in order to derive a set of historical terminal positions and it has the option to exploit the TA measurement for providing an estimate of the current terminal position. Then through the application of statistical filtering (e.g. Kalman filtering) of the resulting terminal position estimates the network can provide a refined and more accurate estimation of the current terminal position. In addition a wide variety of hybrid techniques can be identified in the case that STAMP concept is being exploited depending on additional parameters which can be monitored either in idle mode or in the dedicated mode.

(c) Mobile Terminal (MT) Tracking: this concept refers to a specific category of LBS in which after the setup of the LBS session the network continuously tracks the terminal position based on the regular RSS and TA measurements performed by the terminal. In this case either ECGI technique can be applied or any other hybrid technique which exploits the available RSS and TA measurements.

The expression "base station" is to be taken to encompass both standard macro base stations supporting multiple cells, and also micro or pico-cells as well as Access Points like femto-cells. The number of neighbouring cells being monitored by the mobile terminal usually varies from one up to six, depending on the location and the density of the cells. In an urban environment, the typical number of visible neighbouring cells can be six due to the high density of base stations. As base stations support one or more cells (typical number is three in a cellular network) the number of monitored neighbouring cells corresponds to one up to six different base stations.

Figure 2:
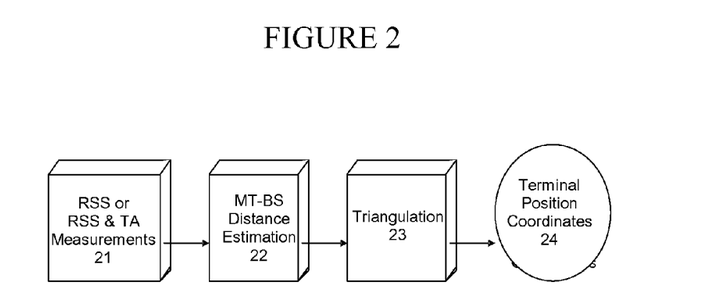
FIG. 2 illustrates a flow chart of the key steps in a RSS based positioning determination process.

With reference to FIG. 2, one process of calculating the mobile terminal position based on a single set of RSS measurements involves the following steps:

(a) Determination of RSS measurements (or RSS and Timing Advance (TA) measurements) (step 21);

(b) Mobile Terminal to Base Station (MT-BS) distance estimation, particularly based on path-loss empirical modes like Hata or Cost231 (step 22);

(c) Triangulation of the estimated distances between the Mobile Terminal and three different adjacent Base Stations (step 23); and (d) Determination of the terminal position coordinates (step 24).

In mobile communications the RSS from a Base Station at a certain location is time-varying and consists of two main factors, namely:

i) the slow fading or local mean which is related to path loss and terrain nature. This factor is characterized by log-normal behavior; and ii) the short-term or fast fading which is caused by multi-path effects. Rayleigh or Rician fading are the relevant models for fast fading, depending on whether there is line of sight or not, respectively.

According to standard mobile terminal operation, RSS is periodically measured and averaged over a given time period. In GSM measurements are made every 480 msec while in dedicated mode and every 2-5 seconds while in idle mode.

For moving mobile terminals, fast fading can be smoothed-out by averaging over 2 T=40-80 fade periods. The remaining slow fading component expressed in decibels can be modeled as a Gaussian random variable with a standard deviation in the order of 8 db-12 db. To eliminate the impact of slow fading the signal should be averaged for longer time periods corresponding to a distance of hundreds of wavelengths covered by a moving terminal (i.e. in the order of 100 m-200 m for 900 MHz operation). In such a case the averaged signal provides the so-called "median component" which corresponds to the RSS which is a direct function of the path loss occurring due to the distance of the MT from the BS. Radio propagation loss models (e.g. Hata and Cost231) can then be exploited so as to estimate the distance between the MT and a BS.

The following formulae illustrate the Hata and Cost231 models:

Hata: $R_x(i) = -K(i) - [69.5 + 26.16 \log(f(i)) - 13.82 \log(h_{bs}(i))] + [44.9 - 6.55 \log(h_{bs}(i))] \cdot \log(d(i)) - c(h_{mt})]$ Cost231: $R_x(i) = -K(i) - [46.33 + 33.9 \log(f(i)) - 13.82 \log(h_{bs}) + [44.9 - 6.55 \log(h_{bs})] \cdot \log(d(i)) - \alpha(h_{mt}) + c]$ (1)

Where:
$R_x(i)$ is the RSS from BS i at the mobile terminal location x in dbm,
$K(i)$ is the transmitting power of BS i in dbm,
$f(i)$ is the transmitter frequency in MHz,
$h_{bs}(i)$ is the height of BS i in m,
$h_{mt}$ is the mobile terminal height in m,
$d(i)$ is the MT-BS i distance in km,
$c(h_{mt})$, $\alpha(h_{mt})$ are environmental functions depending on the height of the mobile terminal (e.g., urban, suburban) and
c is a model specific constant which depends on the radio propagation environment.

These path loss prediction models provide the RSS as a function of the distance of the MT from the BS.

The RSS based estimation of the distance between the MT and the BS is determined based on reverse calculations of the propagation path loss prediction models:

$$\hat{d}(i) = 10^{-\left[\frac{R_x(i) + A(i)}{B(i)}\right]}$$ (2)

Hata: $A(i) = K(i) + 69, 5 + 26,$ $16\log(f(i)) - 13, 82\log(h_{bs}(i)) - c(h_{mt})$ -continued Cost231: $A(i) = K(i) + 46, 33 + 33,$ $$9\log(f(i)) - 13, 82\log(h_{bs}(i)) - a(h_{mt}) + c$$

$$B(i) = 44, 9 - 6, 55\log(h_{bs}(i))$$

Where:

$\hat{d}(i)$ is the resulting estimation of the distance between the MT and BS i, $\hat{R}_x(i)$ is the measured RSS at the MT position x.

B(i): is defined here as a parameter to simplify the equations' analysis.

To illustrate the statistical behavior of the estimator provided in Eq. (2) we consider the following: in the case of the path-loss prediction model being properly calibrated for a specific geographical region then we can assume that RSS can be modeled as a Gaussian/Normal distributed random variable N. Based on Eq. (2) it can be concluded that the estimated MT-BS distance will follow a Lognormal (LN) distribution:

$$\hat{R}_x(i) \sim N(R_x(i), \sigma_{Rx}^2) \Rightarrow \hat{d}(i) \sim LN(\mu_d(i), \sigma_d^2(i)) \quad (3)$$

$$\mu_d(i) = \ln[d(i)] = \ln\left[10^{-\frac{R_x(i)+A(i)}{B(i)}}\right],$$

$$\sigma_d^2(i) = \left(\frac{\ln(10)}{B(i)}\right)^2 \sigma_{Rx}^2 = \beta(i) \cdot \sigma_{Rx}^2$$

where $\sigma_{Rx}^2$ is the variance of the RSS Gaussian distribution, $\mu_d(i)$ and $\sigma_d^2(i)$ is the mean value and the variance of the $\hat{d}(i)$ lognormal distribution respectively. Moreover $\beta(i)$ is defined here as a parameter to simplify the equations' analysis.

It should be noted that the notion $R_x(i)$ corresponds to the RSS value provided by Eq. (1) when the actual MT-BS distance d(i) is used. The distribution provided in Eq. (3) assumes that the error of the rest of the parameters involved in Eq. (1) is negligible compared to the RSS error. Moreover, the above equations apply for omni-directional cell antennas. From Eq. (2) the mean value E, the variance V and the Mean Squared Error (MSE) of the MT-BS distance can be estimated:

$$E(\hat{d}(i)) = d(i) \cdot e^{\beta(i) \cdot \frac{\sigma_{Rx}^2}{2}} \quad (4)$$

$$V(\hat{d}(i)) = d(i)^2 \cdot e^{\beta(i) \cdot \sigma_{Rx}^2} \cdot [e^{\beta(i) \cdot \sigma_{Rx}^2} - 1]$$

$$MSE(\hat{d}(i)) = E([\hat{d}(i) - d(i)]^2) = d(i)^2 \cdot \left[e^{2 \cdot \beta(i) \cdot \sigma_{Rx}^2} - 2 \cdot e^{\beta(i) \cdot \frac{\sigma_{Rx}^2}{2}} + 1\right]$$

From Eq. (4), since the variance and the MSE are not equal, the MT-BS distance estimation provided in Eq. (2) is biased. This estimation is therefore not likely to provide much improvement in the distance estimation accuracy.

Unbiased Distance Estimator

According to a first embodiment of the invention, at a given the MT-BS distance d(i), an unbiased distance estimator has been derived, as provided by the following equation:

$$\hat{d}_1(i) = c_1(i) \cdot \hat{d}(i) = e^{-\beta(i) \cdot \frac{\sigma_{Rx}^2}{2}} \cdot \hat{d}(i) = e^{-\beta(i) \cdot \frac{\sigma_{Rx}^2}{2}} \cdot 10^{-\frac{\hat{R}_x(i)+A(i)}{B(i)}} \quad (5)$$

Indeed the mean value of the distance estimation becomes:

$$E(\hat{d}_1(i)) = e^{-\beta(i) \cdot \frac{\sigma_{Rx}^2}{2}} \cdot E(\hat{d}(i)) = d(i) \quad (6)$$

The variance and the MSE in this case are equal (property of unbiased estimators):

$$V(\hat{d}_1(i)) = MSE(\hat{d}_1(i)) = d(i)^2 \cdot [e^{\beta(i) \cdot \sigma_{Rx}^2} - 1] \quad (7)$$

Minimum Mean Squared Error (MSE) Distance Estimator

According to a second embodiment of the invention the minimum MSE MT-BS distance estimator can be achieved by the introduction of a factor $c_2(i)$ and the minimization of the following function:

$$MSE(\hat{d}_2(i)) = \quad (8)$$

$$E\left([\hat{d}_2(i) - d(i)]^2\right) = d^2(i) \cdot \left[c_2^2(i) \cdot e^{\beta(i) \cdot 2\sigma_{Rx}^2} - 2c_2(i) \cdot e^{\beta(i) \cdot \frac{\sigma_{Rx}^2}{2}} + 1\right]$$

The following equation shows that the MSE is optimized for the following value of $c_2(i)$:

$$c_2(i) = e^{-\beta(i) \cdot \frac{3\sigma_{Rx}^2}{2}} \text{ i.e., } \hat{d}_2(i) = e^{-\beta(i) \cdot \frac{3\sigma_{Rx}^2}{2}} \cdot 10^{-\frac{\hat{R}_x(i)+A(i)}{B(i)}} \quad (9)$$

For this estimator, the MSE, the mean value E and the variance V of the MT-BS distance are expressed as follows:

$$\min\{MSE(\hat{d}_2(i))\} = d^2(i) \cdot [1 - e^{-\beta(i) \cdot \sigma_{Rx}^2}]$$

$$E(\hat{d}_2(i)) = c_2(i) \cdot E(\hat{d}(i)) = d(i) \cdot e^{-\beta(i) \cdot \sigma_{Rx}^2}$$

$$V(\hat{d}_2(i)) = c_2^2(i) \cdot V(\hat{d}(i)) = d^2(i) \cdot e^{-\beta(i) \cdot 2\sigma_{Rx}^2} \cdot [e^{\beta(i) \cdot \sigma_{Rx}^2} - 1] \quad (10)$$

Figure 3:
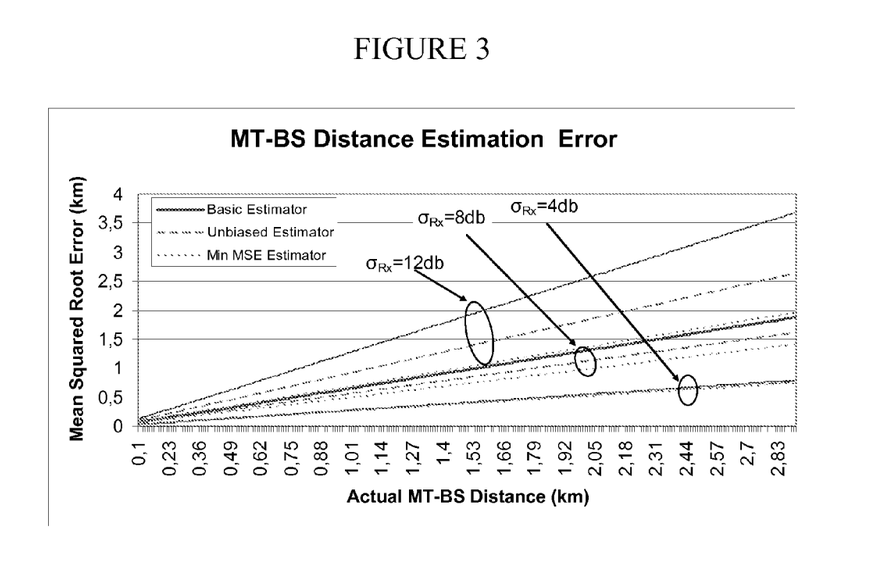
FIG. 3 illustrates provides a graph comparing the mean squared root error of the MT-BS distance for three different variance $\sigma_{Rx}$ values (4 db, 8 db and 12 db) for three different estimators according to different embodiments of the invention.

FIG. 3 provides a comparison of the mean square root error of the MT-BS distance for three different $\sigma_{Rx}$ values (4 db, 8 db and 12 db) for the following estimators:

(a) basic estimator (j=0, Eq. (2)),
(b) unbiased estimator (j=1, Eq. (5) first embodiment) and
(c) minimum MSE estimator (j=2, Eq. (9) second embodiment).

The index "j" has been arbitrarily assigned to assist in identifying the estimators in subsequent formulae. As it can be seen from FIG. 3, even though the error increases with increasing values of RSS standard deviation $\sigma_{Rx}$, the unbiased estimator and the minimum MSE estimator, in particular, deliver significant improvement in the distance estimation error especially for high $\sigma_{Rx}$ values.

As can be seen from FIG. 2, the distance determination is one component of the RSS based terminal positioning technique, with another component being triangulation. Therefore this is another area where the calculations of the distance estimators may be refined to reduce the error in the positional estimation.

Triangulation Error Analysis

In this regard, triangulation is a geometrical method which uses estimated distances between the MT and three different BSs to provide the MT position. Triangulation is expressed by the following equations:

$$(x-x_i)^2 + (y-y^i)^2 = d^2(i), \text{ for } i=1,2,3 \quad (11)$$

Where (x,y) are the mobile terminal position coordinates and $(x_i, y_i)$ i=1, 2, 3 are the coordinates of the base stations (typically 3 required for triangulation calculations). By subtracting the $3^{rd}$ equation (i=3) from the $1^{st}$ (i=1) and the $2^{nd}$ (i=2) from the $1^{st}$ (i=1) we get:

$$-2x(x_1 - x_i) - 2y(y_1 - y_i) = d^2(1) - d^2(i) - x_1^2 + x_i^2 - y_1^2 + y_i^2,$$
$$i=2,3 \quad (12)$$

From Eq. (12) it is feasible to estimate the terminal position (x,y) as follows:

$$x = \frac{2}{D}[-(y_2 - y_3) \cdot d^2(1) + (y_1 - y_3) \cdot d^2(2) - (y_1 - y_2) \cdot d^2(3) - \qquad (13)$$
$$(y_1 - y_2) \cdot (y_1^2 - y_3^2 + x_1^2 - x_3^2) + (y_1 - y_3) \cdot (y_1^2 - y_2^2 + x_1^2 - x_2^2)]$$
$$y = \frac{2}{D}[(x_2 - x_3) \cdot d^2(1) - (x_1 - x_3) \cdot d^2(2) + (x_1 - x_2) \cdot d^2(3) + $$
$$(x_1 - x_2) \cdot (y_1^2 - y_3^2 + x_1^2 - x_3^2) - (x_1 - x_3) \cdot (y_1^2 - y_2^2 + x_1^2 - x_2^2)]$$

Eq. (13), for simplicity, can also be written as:

$$z = \frac{1}{D}\left[\sum_{i=1}^{3} a_z(i) \cdot d^2(i) + \Omega_z\right], \; z = x, y \qquad (14)$$

Where $\Omega_z$ and $a_z(i)$, $i=1, 2, 3$, $z=x,y$ can be directly derived from Eq. (13) and D is provided by the following equation:

$$D = 4 \cdot (x_1 - x_2) \cdot (y_1 - y_3) - 4 \cdot (x_1 - x_3) \cdot (y_1 - y_2) \qquad (15)$$
$$= 4 \cdot \begin{vmatrix} x_1 & y_1 & 1 \\ x_2 & y_2 & 1 \\ x_3 & y_3 & 1 \end{vmatrix}$$

Eq. (15) indicates that D is equal to 4 times the area of the triangle defined by the three BSs. It is clear that unless the three BSs are in the same line we have $D \neq 0$ which yields a unique solution in the triangulation problem described by Eq. (14). Note that this property applies for any set of distances $d(i)$ $i=1, 2, 3$ even if there is error in their estimation. Therefore the employment of this approach is applicable to RSS and ECGI based positioning where the estimated distances between the MT and the three BSs definitely contain error.

The error of the MT position as estimated through triangulation is provided by the following equation:

$$\hat{z}_j = \frac{1}{D}\left[\sum_{i=1}^{3} a_z(i) \cdot \hat{d}_j^2(i) + \Omega_z\right] \qquad (16)$$
$$= z + \frac{1}{D}\left[\sum_{i=1}^{3} a_z(i) \cdot [\hat{d}_j^2(i) - d^2(i)]\right], z = x, y$$

Where j is the index of the distance estimator (i.e. j=0 corresponds to basic distance estimator (Eq. 2)).

Assuming a given set of distances between the MT and three different BSs $d(i)$ ($i=1, 2, 3$) the mean value E and the variance V of the estimated MT coordinates are the following (assuming that the random variables $\hat{d}_j(i)$, $i=1, 2, 3$ are independent):

$$E(\hat{z}_j) = z + \frac{1}{D}\left[\sum_{i=1}^{3} a_z(i) \cdot d^2(i) \cdot [c_j^2(i) \cdot e^{\beta(i) \cdot 2\sigma_{Rx}^2} - 1]\right], \qquad (17a)$$

$z = x, y$ and $j = 0, 1, 2$ $$V(\hat{z}_j) = \frac{1}{D^2}\left[\sum_{i=1}^{3} a_z^2(i) \cdot d^4(i) \cdot c_j^4(i) \cdot e^{\beta(i) \cdot 4\sigma_{Rx}^2} \cdot [e^{\beta(i) \cdot 4\sigma_{Rx}^2} - 1]\right], \qquad (17b)$$

$z = x, y$ and $j = 0, 1, 2$

And the MSE in the estimation of the terminal coordinates will be ($z=x, y$ and $j=0, 1, 2$):

$$MSE(\hat{z}_j) = \qquad (18)$$
$$\frac{1}{D^2}\left[\sum_{i=1}^{3} a_z^2(i) \cdot d^4(i) \cdot [c_j^4(i) \cdot e^{8\beta(i) \cdot \sigma_{Rx}^2} - 2c_j^2(i) \cdot e^{2\beta(i) \cdot \sigma_{Rx}^2} + 1] + \right.$$
$$\left. \sum_{i=1}^{3}\sum_{\substack{k=1 \\ k \neq i}}^{3} a_z(i) \cdot a_z(k) \cdot d^2(i) \cdot d^2(k) \cdot f_j(i, k)\right]$$

$$f_j(i, k) = [c_j^2(i) \cdot c_j^2(k) \cdot e^{2(\beta(i)+\beta(k)) \cdot \sigma_{Rx}^2} - $$
$$c_j^2(i) \cdot e^{2\beta(i) \cdot \sigma_{Rx}^2} - c_j^2(k) \cdot e^{2\beta(k) \cdot \sigma_{Rx}^2} + 1]$$

Unbiased Terminal Coordinates Estimator

According to a third embodiment of the invention, a mobile terminal (MT) position estimator is provided, which is based on the triangulation process calculations.

To achieve an unbiased estimation of the MT positional coordinates (x, y), the following unbiased MT-BS distance estimator is introduced:

$$\hat{d}_3(i) = c_3(i) \cdot \hat{d}(i), \text{ with } c_3(i) = e^{-\beta(i) \cdot \sigma_{Rx}^2} \qquad (19)$$

The mean value E, the variance V and the MSE of the MT coordinates estimation after triangulation becomes:

$$E(\hat{z}_3) = z, \qquad (20)$$
$$V(\hat{z}_3) = MSE(\hat{z}_3) = \frac{1}{D^2}\left[\sum_{i=1}^{3} a_z^2(i) \cdot d^4(i) \cdot [e^{4\beta(i) \cdot \sigma_{Rx}^2} - 1]\right],$$
$z = x, y$ As expected the MSE equals the variance in this case due to the unbiased nature of the estimator.

Terminal Coordinates MSE Estimator

According to a fourth embodiment of the invention, a sub-optimal MSE estimator of the mobile terminal (MT) position is provided, which is based on the outcome of the triangulation process, using an appropriate distance estimator.

A sub-optimal estimator is based on Eq. (18), where the MSE of the MT coordinates estimation is reduced by minimizing the following quantities:

$$\min\{E[(\hat{d}_2(i) - d^2(i))^2]\}, i=1,2,3 \qquad (21)$$

Based on Eq. (18) the minimization of the quantities of Eq. (21) takes place when the following estimator is applied:

$$\hat{d}_4(i) = c_4(i) \cdot \hat{d}(i), \text{ with: } c_4(i) = e^{-3\beta(i) \cdot \sigma_{Rx}^2}, i=1,2,3 \qquad (22)$$

In this case the mean value and the variance of the estimated terminal coordinates will be:

$$E(\hat{z}_4) = z + \frac{1}{D}\sum_{i=1}^{3} a_z(i) \cdot d^2(i) \cdot [e^{-4\beta(i) \cdot \sigma_{Rx}^2} - 1] \qquad (23)$$

$$V(\hat{z}_4) = \frac{1}{D^2}\sum_{i=1}^{3} a_z^2(i) \cdot d^4(i) \cdot e^{-8\beta(i) \cdot \sigma_{Rx}^2}[e^{4\beta(i) \cdot \sigma_{Rx}^2} - 1]$$

And the resulting MSE will be:

$$MSE(\hat{z}_A) = \frac{1}{D^2}\left[\sum_{i=1}^{3} a_z^2(i) \cdot d^4(i) \cdot \left[1 - e^{-4\beta(i)\cdot\sigma_{Rx}^2}\right]\right] + \quad (24)$$

$$\frac{1}{D^2}\sum_{\substack{k=1\\k\neq i}}^{3} a_z(i) \cdot a_z(k) \cdot d^2(i) \cdot$$

$$d^2(k) \cdot \left[e^{-4[\beta(i)+\beta(k)]\cdot\sigma_{Rx}^2} - e^{-4\beta(i)\cdot\sigma_R^2} - e^{-4\beta(k)\cdot\sigma_{Rx}^2} + 1\right], z = x, y$$

The estimator in Eq. 22 is sub-optimal as to optimally minimize the MSE of the MT coordinates the following set of simultaneous equations should apply:

$$\frac{\partial MSE(\hat{z}_j(i))}{\partial c_j(i)} = 0 \quad (25)$$

$$z = x, y \text{ and } i = 1, 2, 3$$

However, the resulting solution for $c_j(i)$ leads to a function of the actual MT-BS distances $d(i)$ for which the parameters are not known, so Eq. 21 is not a practical solution.

Terminal Position Estimation Error

To illustrate the effectiveness of the unbiased terminal co-ordinates estimator, the error in the estimation of the terminal position will be analyzed based on the error introduced in the estimation of the terminal coordinates through the triangulation method using this estimator. In this regard the error based on terminal position can be estimated as:

$$\hat{e}_j = \sqrt{(\hat{x}_j - x)^2 + (\hat{y}_j - y)^2} = \sqrt{\Delta\hat{x}_j^2 + \Delta\hat{y}_j^2}, j = 0, 1, 2, 3, 4 \quad (26)$$

As no obvious distribution for the above parameter can be derived an approximation through the following Rice distribution is considered:

$$\hat{e}_j \sim \text{Rice}(u_e(j), \sigma_e^2(j)) \quad (27)$$

The above approximation is based on the following assumptions: $\Delta\hat{x}_j$ and $\Delta\hat{y}_j$ are assumed to be independent random variables with Gaussian distribution with mean values $E(\Delta\hat{x}_j)$, $E(\Delta\hat{y}_j)$ respectively and common variance of $\sigma_e^2(j)$. The mean value and the variance of the MT positioning error can therefore be approximated as follows:

$$E(\hat{e}_j) = \sigma_e(j) \cdot \sqrt{\frac{\pi}{2}} \cdot L_{1/2}\left(-\frac{u_e^2(j)}{2\sigma_e^2(j)}\right) \quad (28)$$

$$V(\hat{e}_j) = 2\sigma_e^2(j) + u_e^2(j) - \frac{\pi\sigma_e^2(j)}{2} \cdot L_{1/2}^2\left(-\frac{u_e^2(j)}{2\sigma_e^2(j)}\right)$$

The parameter $u_e(j)$ is provided by the following equation:

$$u_e(j) = \sqrt{E(\Delta\hat{x}_j)^2 + E(\Delta\hat{y}_j)^2} \quad (29)$$

To estimate $u_e(j)$ for a given MT location (i.e., for given distances $d(i)$, $i=1, 2, 3$), Eq. (16) can be exploited, which defines the error of the MT position as estimated through triangulation. Regarding parameter $\sigma_e^2(j)$, since the assumption of common variance for $\Delta\hat{x}_j$ and $\Delta\hat{y}_j$ is not valid the following approximation is applied from the definition of the error variance and Eqs. (26), (28):

$$V(\hat{e}_j) = E(\hat{e}_j^2) - E(\hat{e}_j)^2 \quad (30)$$

$$= E(\Delta\hat{x}_j^2 + \Delta\hat{y}_j^2) - \frac{\pi\sigma_e^2(j)}{2} \cdot L_{1/2}^2\left(-\frac{u_e(j)}{2\sigma_e^2(j)}\right)$$

From Eqs. (28), (29), (30) we get:

$$\sigma_e^2(j) = \frac{1}{2}[V(\Delta\hat{x}_j) + V(\Delta\hat{y}_j)] \quad (31)$$

Parameters $V(\Delta\hat{x}_j)$ and $V(\Delta\hat{y}_j)$ for a given MT location are provided by Eq. (17) as:

$$V(\Delta\hat{z}_j) = V(\hat{z}_j - z) = V(\hat{z}_j), z = x, y \quad (32)$$

The application of the unbiased MT coordinates estimator (j=3, see also Eq. (19)) leads to a zero average value for both $\Delta\hat{x}_3$ and $\Delta\hat{y}_3$. In this case $u_e(j)$ becomes also zero and the MT positioning error distribution can be approximated by a Rayleigh distribution.

To illustrate the effectiveness of the estimators, a simulation model has been developed. The model considered a geographical area with a set of base stations each supporting three cells, with each cell corresponding to a 120 degree sector of equal radius. During the simulation the position of the mobile terminal was randomly selected within this area and the RSS levels from each of the base stations estimated from the Hata model. A Gaussian white noise with variance $\sigma_{Rx}^2$ was then added to the resulting RSS and the mobile terminal coordinates estimation process undertaken, using the basis estimator (j=0), the unbiased estimator (j=1) and the minimum MSE estimator (j=2).

Figure 4:
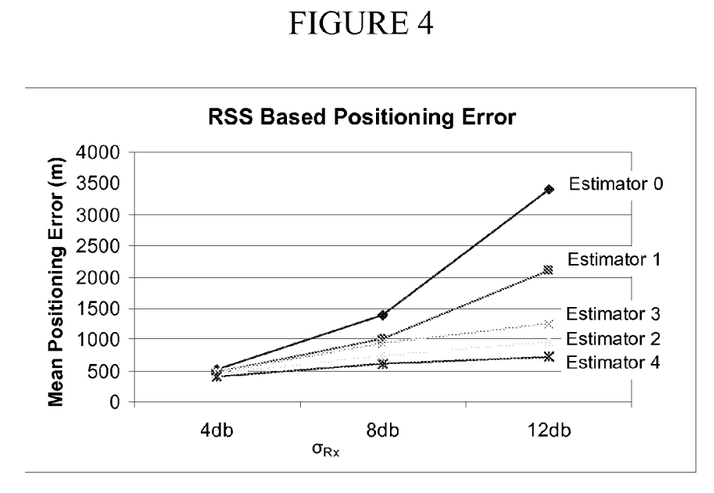
FIG. 4 illustrates a graph comparing the performance of the RSS estimators, according to embodiments of the invention, in a RSS based positioning technique.

The estimated terminal position that was obtained was then compared with the actual terminal position to determine the positioning error (Eq. (26)). In this regard, FIG. 4 provides the resulting mean error of the mobile terminal position estimation using the various estimators presented in this paper (j=0, 1, 2, 3, 4) for a variety of $\sigma_{Rx}$ (4 db, 8 db and 12 db) and for a cell radius of 1500 m. To summarise the estimators shown in FIG. 4:

estimator 0 (j=0) is the basic biased distance estimator from Eq. 2;
estimator 1 (j=1) is the unbiased distance estimator of Eq. 5;
estimator 2 (j=2) is the Minimum MSE distance estimator of Eq. 9;
estimator 3 (j=3) is the unbiased terminal coordinates estimator of Eq. 19; and
estimator 4 (j=4) is the suboptimal terminal coordinates MSE estimator of Eq. 22.

FIG. 4 indicates that the suboptimal MT coordinates MSE estimator (j=4) provides the best accuracy. Also, the minimum distance MSE estimator (j=2) outperforms unbiased MT coordinates estimator (j=3). It is clear from FIG. 4 that significant improvement is achieved by the estimators of the present invention, especially for high values of RSS standard deviation ($\sigma_{Rx}$). However, even the best performing estimator (j=4) leads to an accuracy in the order of 500 m.

In order to show the applicability of these estimators to RSS based positioning a set of alternative techniques have been analyzed, namely: CGI (Cell Global Identity), CGI+TA and ECGI.

According to the CGI technique only the Cell Identity is taken into account so it has been assumed that the MT is positioned at the centroid of the cell coverage.

In CGI+TA technique the distance between the MT and the BS is estimated based on the Timing Advance parameter. According to GSM specifications, Timing Advance is an integer with a range of 0 to 63 and allows the MT while in dedicated mode to estimate the correct transmission timing towards the BS. One Timing Advance unit corresponds to a distance of approximately 550 m. Therefore, for this technique we have assumed that the Tracking Area corresponds to the delay exclusively caused by the MT-BS distance so that the distance is approximated by the following equation:

$$d_{TA} = TA \cdot 550m + \frac{550}{2}m, \ TA = 0, 1, 2, \ldots, 63 \quad (33)$$

Therefore, in the CGI+TA technique the MT position has been assumed to be at a distance $d_{TA}$ and at an angle identical to the cell antenna azimuth.

In ECGI, the distance from the BS of the primary cell is also estimated based on the Timing Advance according to Eq. (33). Then based on RSS the distance from another two BSs is estimated and triangulation is applied. Therefore, the analysis for the RSS based MT-BS distance estimators also applies to the ECGI technique.

Figure 5:
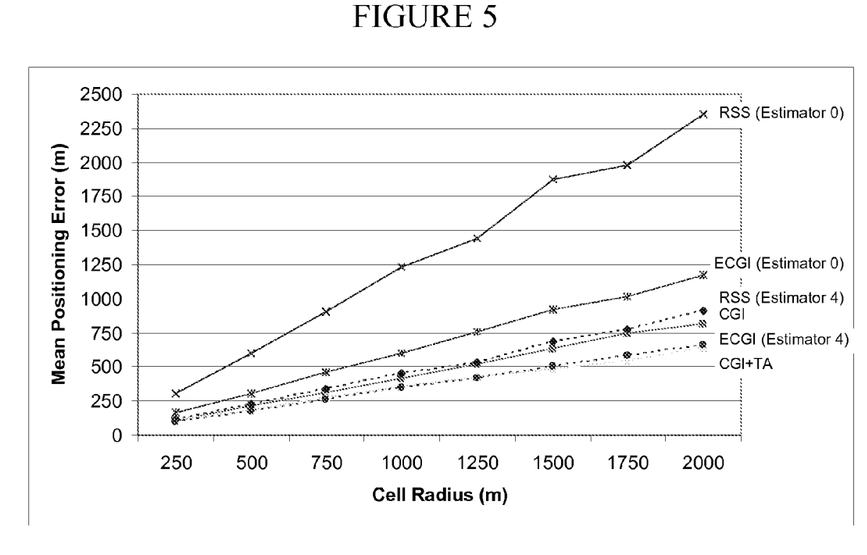
FIG. 5 illustrates a graph comparing the performance of different RSS based positioning techniques using different estimators according to different embodiments of the invention.

The accuracy of these techniques, namely CGI, CGI+TA, RSS based and ECGI is compared in FIG. 5 for $\sigma_{Rx}$=8 db. The RSS based techniques (i.e. RSS and ECGI) are provided for the basic and the best performing estimators (j=0 and j=4 respectively). FIG. 5 indicates that RSS and ECGI techniques using the basic biased estimator provide less accuracy than the simpler techniques of CGI and CGI+TA. The basis estimator is therefore not a commercially attractive approach. The best performing estimator (j=4) significantly improves the performance of both RSS and ECGI based positioning however, the resulting accuracy is still in the order of accuracy provided by CGI and CGI+TA respectively. In this context, the commercial interest for applying either RSS based or ECGI based positioning is rather questionable.

Therefore, according to a further embodiment of the invention, the estimators are utilized in the STAMP technique described in GB2416461. In this regard, this technique collects a time series of RSS measurements while the MT is in idle mode. The terminal position estimation process according to the STAMP technique in this example is undertaken by applying an adaptive Kalman filter to the estimated terminal position coordinates (i.e. the output of the FIG. 2 process). The main assumption required by Kalman filter in this case, is that the difference between the estimated and the actual terminal coordinates follow a zero mean normal distribution. As shown in the analysis of the previous section of the paper this assumption can be approximated by using the MT-BS distance estimator which leads to unbiased estimation of the terminal coordinates (see Eq. (19)).

Figure 6:
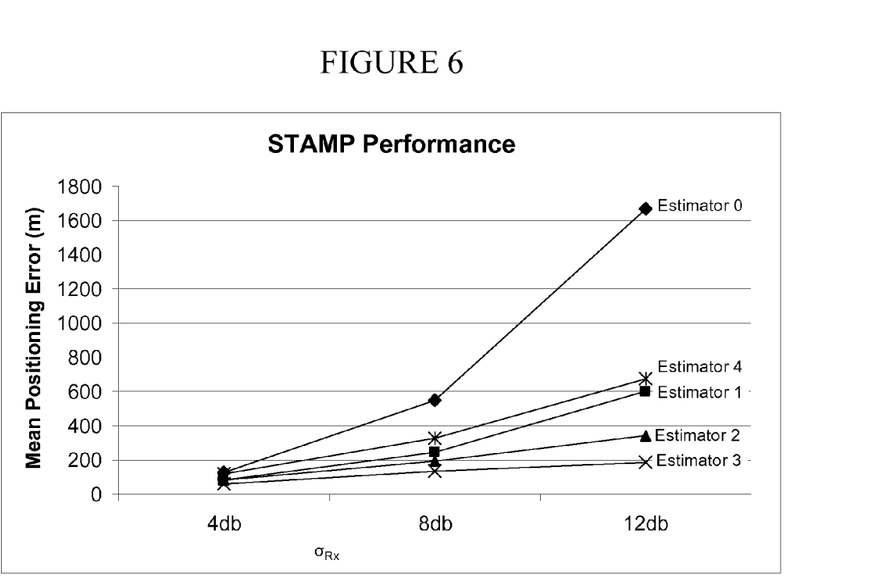
FIG. 6 illustrates a graph comparing the performance for different estimators according to embodiments of the invention as used in the STAMP technique.

FIG. 6 depicts the performance of the STAMP technique for the five different estimators (j=0 to 5). This graph shows estimator 3 (i.e. the Unbiased MT coordinates estimator) to be the best performing estimator, with a mean positioning error of the order of 200 m (c.f. FIG. 4 where the mean positioning error for the best estimator in RSS based positioning was of the order of 550 m).

Figure 7:
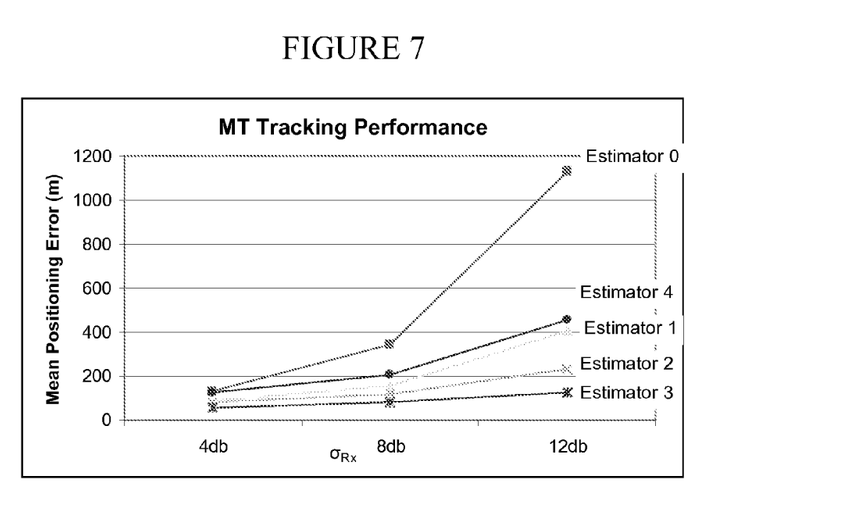
FIG. 7 illustrates a graph comparing the performance of different estimators according to embodiments of the invention as used in the MT Tracking technique.

FIG. 7 illustrates a graph showing the performance of the MT Tracking technique for each of the estimators j=1 to 4. As described earlier, MT Tracking is a technique in which after the setup phase of an LBS session the network constantly monitors the Mobile Terminal position exploiting the regular measurements of RSS and TA. Therefore compared to STAMP technique in MT tracking the RSS measurements are more frequent (every 480 ms in GSM) and TA parameter is always available (as the terminal is in dedicated mode).

Figure 8:
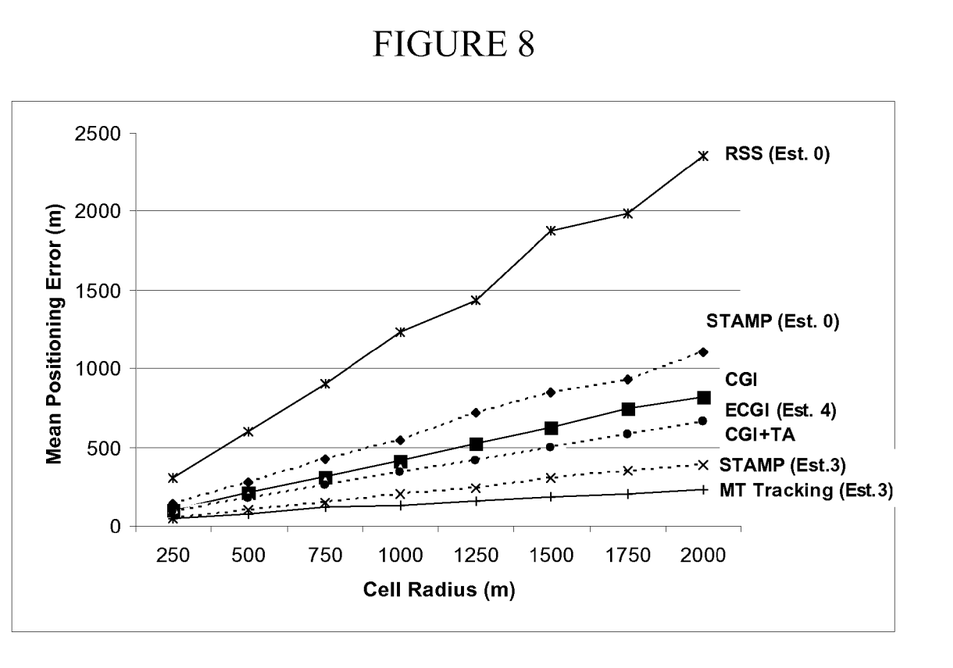
FIG. 8 illustrates the comparative performance of CGI, CGI+TA and ECGI, STAMP and MT Tracking utilising the estimators calculated according to an embodiment of the invention.

FIG. 8 provides an overall comparison of the various techniques, showing the overall difference between the worst performing approach (i.e. RSS based positioning using Estimator 0) and the best performing techniques, STAMP and MT Tracking using Estimator 3.

More specifically, FIG. 8 provides a comparison between the accuracy provided by RSS based positioning (Estimator 1), CGI, CGI+TA, ECGI (Estimator 4), STAMP (Estimator 0 and 3) and MT Tracking. As can be seen from this Figure, the performance of non-optimized STAMP (i.e. with Estimator 0) approaches the CGI method despite the fact that it delivers significant improvement of the plain RSS based positioning.

The optimized STAMP (i.e., when the unbiased MT coordinates estimator j=3 is exploited) clearly outperforms both CGI, CGI+TA and ECGI techniques. Moreover the resulting MT positioning accuracy for this optimised STAMP is in the range of 100 m-200 m even for high cell radius values (FIG. 8) and also for high RSS standard deviation values (FIG. 6). The performance of the STAMP technique corresponds to an improvement of about 50% in accuracy compared to the CGI, CGI+TA and ECGI techniques.

This shows that the optimised estimators used in conjunction with techniques like STAMP can provide advantageous results, and accordingly are likely to be very promising in terms of commercial exploitation. STAMP is a particularly advantageous technique, as it can be implemented solely using software modifications, which reduces deployment costs.

The accuracy of MT tracking based on estimator 3 (i.e. which uses estimator 3 for estimating the distances between the MT and the second and third BS and the known Tracking Area (TA) for the estimation of the distance from the first BS) is higher than optimized STAMP for two main reasons:
  (a) the exploitation of TA which in our simulation model is considered to be always correct (something that is not always true in real networks) and
  (b) the shorter sampling period applied in MT tracking (480 msec for an active session in GSM compared to 2-5 sec during the MT idle mode operation).

Overall, FIG. 8 shows the empirical benefits that are achievable by the estimators of the present invention, particularly when combined with existing position determining techniques, such as STAMP and MT Tracking.

Although the analysis provided in the simulation model has used some assumptions which are not fully applicable in a real network (e.g. omni-directional antennas), it is believed that the model is nevertheless a good indication of the theoretical accuracy which can be achieved through RSS based positioning.

The estimators of the present invention have been derived, taking into account the nature of path-loss propagation models (like Hata and Cost231) and also the error introduced in the estimation of the MT-BS distance as well as the error introduced in the triangulation process. Advantageously the estimators have been shown, via FIGS. 6 to 8, to minimise the impact of the position calculation process on the resulting accuracy. The results indicate a very significant improvement in the RSS based positioning when applied to a single set of RSS measurements.

The embodiments of the invention have been described in relation to the mobile terminal monitoring and determining RSS measurements. This is not essential to the invention, and the same functionality may be implemented external to the terminal. For instance, the terminal may forward the RSS measurements to the core network for processing.

The above listed tracing techniques used with LBS are applicable to various network configurations including 2G, 3G and 4G networks.

Further, although the present invention has particularly applicability to RSS measurements, any other suitable parameter applying to communications between the mobile terminal and its adjacent base stations may be used (e.g. Observed Time Difference) as well as measurements associated to other technologies like GPS. More particularly, it is to be appreciated that the estimators according to the embodiments of the invention are particularly applicable to the RSS parameter because of its statistical nature, and other parameters with a similar error distribution.

The invention claimed is:

1. A method of estimating the location of a mobile terminal in a mobile communications network having a plurality of base stations, the method including:
   determining at least one signal parameter measurement for the mobile terminal in relation to each of the plurality of base stations;
   using the determined signal parameter measurements to obtain a first distance estimation of the mobile terminal from each of the plurality of base stations; and
   using at least one estimator on each of the first distance estimations to obtain a refined distance estimation of the mobile terminal from each of the plurality of base stations, the plurality being the number i, the estimator conforming to a format selected from the following:

a) $\hat{d}_1(i) = c_1(i) \cdot \hat{d}_{(i)} = -e^{-\beta(i)\frac{\sigma_{Rx}^2}{2}} \cdot \hat{d}(i) = e^{-\beta(i)\frac{\sigma_{Rx}^2}{2}} \cdot 10^{-\frac{\hat{R}_x(i)+A(i)}{B(i)}}$ b) $\hat{d}_2(i) = e^{-\beta(i)\frac{3\sigma_{Rx}^2}{2}} \cdot 10^{-\frac{\hat{R}_x(i)+A(i)}{B(i)}}$ c) $\hat{d}_3(i) = c_3(i) \cdot \hat{d}(i)$, with $c_3(i) = e^{-\beta(i)\sigma_{RX}^2}$ d) $\hat{d}_4(i) = c_4(i) \cdot \hat{d}(i)$, with $c_4(i) = e^{-3\beta(i)\sigma_{Rx}^2}$ where:
i=1, 2, 3,
$\sigma_{Rx}^2$ is the variance of a Received Signal Strength (RSS) Gaussian distribution,
$\beta(i) = (\ln(10)/B(i))^2$,
$B(i) = 44.9 - 6.55 \log h_{bs}(i)$,
$h_{bs}(i)$ is the height of Base Station (i) in meters,
$A(i)$ is an estimation of a propagation path-loss quantity from Base Station (i),
$R_x(i)$ is the measured RSS from Base Station (i) in dbm at the terminals actual location; and
using said plurality of refined distance estimators to obtain a positional estimation of the mobile terminal.

2. The method according to claim 1, wherein the at least one signal parameter measurement determined is a RSS measurement and a RSS based positioning technique is used to obtain the first distance estimation of the mobile terminal location.

3. The method according to claim 1, wherein the propagation path loss quantity is determined used a Hata model or a Cost231 model.

4. The method according to claim 1 further including using the distance estimations in triangulation calculations to estimate the location of the mobile terminal, and the step of using at least one estimator includes using a terminal coordinates estimator to obtain a refined positional estimate of the terminal relative to the plurality of base station, the plurality being a number i.

5. The method according to anyone preceding claim 1 further including performing adaptive Kalman filtering on the positional estimation of the mobile terminal.

6. The method according to claim 1 wherein the mobile terminal is active and the plurality of base stations comprise a serving base station and a plurality of neighboring base stations, and the method further includes:
   using the at least one estimator to estimate the distance of the terminal from each of the plurality of neighboring base stations; and
   using a timing advance measurement to estimate the distance of the terminal from the serving base station.

7. A mobile terminal configured to perform a method according to the method of claim 1.

8. The mobile terminal of claim 7 further including a GPS receiver and a processor configured to estimate the position of the terminal using signals received by the GPS receiver, the mobile terminal using the method according to the method of claim 1 when appropriate signals are not available from the GPS receiver.

9. A communications network element configured to perform a method according to the method of claim 1.

10. A mobile telecommunications network configured to perform a method according to the method of claim 1.

* * * * *